United States Patent Office 2,822,303
Patented Feb. 4, 1958

2,822,303
HIGH D. E. SYRUP AND METHOD OF MAKING SAME

Carol L. Campbell, Cambridge, Mass., and Monroe J. Mason, Glendale, Mo., assignors to Anheuser-Busch, Incorporated, St. Louis, Mo., a corporation of Missouri No Drawing. Application June 8, 1956
Serial No. 590,114

7 Claims. (Cl. 127—38)

The present invention relates generally to the dual conversion or hydrolysis of starch products, and more particularly to a novel high dextrose equivalent corn syrup which has a high maltose/dextrose ratio and a low dextrin content, and to the method of making the same.

The hydrolysis product of corn starch variously known as corn syrup, glucose, and corn syrup unblended (C. S. U.) is a well established food product, adapted for use in many different process foods, including bakery products, confectionery, ice creams and sherbets, icings and table syrups. In the past decade, however, a demand for a sweeter corn syrup has grown to considerable proportions. Corn syrup unblended contains reducing sugars and dextrins to the extent of 42% to 45% calculated as dextrose, from which is derived the term 42 D. E. syrup. Sweeter syrups have been produced in the ranges of 52 to 56 D. E. and 58 to 63 D. E. Because of their increased sweetness, such high D. E. syrups have won high acceptance. Unfortunately, their inherent sweetness is generally accompanied by less desirable properties, specifically, more or less bitter taste, inherent or incipient amber color, tendency to crystallize, and development of haze during long shelf life.

Corn syrup unmixed, in the range of 42 to 45 D. E. is quite generally made by acid hydrolysis. It has a bland, moderately sweet taste, a mild characteristic flavor, probably due to dextrins, and a sticky or gummy consistency at a commercial Baumé of 43°. "High Purity" syrups ranging from 52 to 56 D. E. are customarily made by acid hydrolysis. They are sweeter and somewhat less gummy than C. S. U. but usually have a readily detectable bitter taste thought to be due to reversion products. Still sweeter corn syrups, i. e. in the range of 58 to 63 D. E., have also been made by acid conversion. Such syrups have a more pronounced bitterness and a greater tendency to crystallize than lower D. E. syrups. Bitterness is not removed by the ion-exchange treatments which have been found effective for removal of the greater part of color, ash and protein.

Starch conversion syrups have also been made by the use of saccharifying enzymes such as amylases of malt, mold bran, and certain bacteria. Such enzyme-converted syrups contain about the same amount of dextrose, about twice the amount of maltose, and only about half the amount of dextrins as are found in acid-converted syrups. Since dextrins have little or no sweetening power, enzyme-converted syrups are sweeter than acid-converted syrups of the same dextrose equivalent (D. E.). Unfortunately, however, the syrups made wholly by enzymic hydrolysis are dark in color with off-flavors which made them unsuitable for certain food products.

With the aforementioned characteristics of the known syrups in mind, it is an object of the present invention to provide a novel, dual conversion syrup of high D. E. content which is colorless, which has a cool sweet taste with no burning sensation, bitter aftertaste, or gumminess, and which has a low viscosity.

Another object is to provide a high D. E. syrup which is low in ash and protein content, which is low in dextrin content, which has a high maltose content and a high maltose/dextrose ratio. More particularly it is an object to provide such a high D. E. syrup which has a dextrose equivalent of from 52% to 65%, a maltose content of from 37% to 48%, a dextrin content of from 4% to 7.5%, a dextrose content of from 18% to 37%, a maltose/dextrose ratio of between 1.0 and 2.5, and preferably between 1.2 and 1.6.

Another object is to provide a process for a dual conversion high D. E. syrup in which the characteristics and composition of the syrup such as maltose content and maltose/dextrose ratio, can be varied at will. More particularly, it is an object to provide such a process in which one of the steps comprises an enzymic hydrolysis in which a fungal-type saccharifying enzyme preparation is added to the substrate, or preferably two or more complementary preparations are added to the substrate in equal or varying proportions and at the same or different times, to provide syrups having different characteristics and compositions.

Further objects and advantages of the present invention will be apparent from a consideration of the following detailed description.

Briefly stated, the process of the present invention comprises subjecting an aqueous starch suspension to a limited acid conversion to produce a liquid having a dextrose equivalent analysis of between 15% and 24%, and preferably between 17% and 23%, and subjecting the resultant liquor to the action of one or more saccharifying enzyme preparations having predetermined diastase and maltase activity and when two or more are used, adding them at the same time or at different times, to increase the dextrose equivalent to between 52% and 65%.

Applicants have learned that bitterness and color in syrups, such as corn syrups and the like, are associated with the formation of reversion products which increase in quantity as acid conversion proceeds. Bitterness and degree of acid conversion probably have no straight line relationship, but more likely have a logarithmic relationship. Stating it differently, there is an abrupt and marked increase in bitterness as acid conversion is prolonged beyond a certain point, but even before that point is reached, considerable bitterness results. Other properties of corn syrup such as color and shelf life are also similarly related to the degree of acid conversion. The initial yellow or amber color appraently develops during the evaporation of the syrup from the reversion products formed by acid hydrolysis and this color is usually intensified by long aging or shelf life.

Applicants have also learned that the dextrose content is especially dependent on the degree of acid conversion. because in acid conversion, dextrose is the principal sugar formed.

Therefore, it is now appreciated that if the acid hydrolysis is of a very limited extent, the formation of the conversion products will also be limited so as to minimize the bitterness and color. Also, if the dextrose formation is kept low as by the use of a selected enzyme preparation or complementary preparations having predetermined diastase and maltase activity, the greater will be the formation of maltose during the enzymic conversion, and consequently the higher the maltose/dextrose ratio.

An initial step in the production of the improved high D. E. dual conversion syrup which is the subject matter of the present invention, is subjecting starch to a hydrolyzing action with an acid sufficient to give a dextrose equivalent of from 15% to 24% and preferably from 17% to 23%. This latter range is selected because it achieves a balance between optimum quality of product as to bitterness, mouth feel and color, and practical operating conditions.

A further step in the present novel process is subjecting the previously acid-hydrolyzed starch to a further hydrolytic action by one or more fungal-type saccharifying enzyme preparations, and when two or more are used, adding them at the same time or at different times, to increase the sugar content to the desired extent, as for example to 52 to 65 D. E., while maintaining the maltose/dextrose ratio in the range of 1.0 to 2.5, and preferably between 1.2 and 1.6.

The syrup produced by this novel process has a true maltose content of from 37% to 48% and a reducing dextrin content not over 7.5% and preferably in the range of 4.0% to 6.0%.

Best results have been obtained by using two or more complementary enzyme preparations because the characteristics of the syrup as to D. E. content and ratio of maltose to dextrose can be manipulated at will by varying the relative amounts of the enzymes and the order in which they are added to the liquor. Excellent results have been obtained by using together one diastatic, fungal-type enzyme of relatively low maltase content and another of relatively high maltase content.

There are a number of diastatic enzyme preparations available commercially in purified form which will provide the desired conversion characteristics, many of which are derived from Aspergillus oryzae and like fungal sources. Among enzymes of this type which were used in the instant process were those obtained from Rohm & Haas Company, Philadelphia, Pa. and designated as Rhozyme S, Rhozyme #33, Diastase #32, and Diastase #33. Rhozyme S and Diastase #32 are diastatic enzymes which are characterized by considerable maltase activity and therefore high dextrose-producing power, whereas Rhozyme #33, Diastase #33, and Diastase #34 are low in maltase activity.

As one example of the present process, a starch slurry of 22° to 24° Baumé was hydrolyzed to 17.5% D. E. with acid, according to established industrial procedure. After one carbon treatment and filtration, the partially converted carbohydrate material was adjusted to 21° to 22° Baumé and a pH of 4.5. It was heated to 175° to 180° F. for 20 minutes to destroy possible fermentative microorganisms, then cooled to between 113° and 115° F. Selected diastatic, fungal-type enzymes were added, using one diastase of low maltase content, another relatively high in maltase, at about a 1:1 ratio, and at a concentration calculated to give the desired conversion time. Conversion was continued with gentle agitation at between 113° to 115° F. until a dextrose equivalent of 58% to 60% was reached. The enzymes were then inactivated at an elevated temperature, in the neighborhood of 170° to 180° F. for 20 minutes. The syrup was then clarified, filtered and concentrated following best known industrial practices.

The clarification can be accomplished wholly with activated carbon, or it may be achieved with carbon treatment followed by passage through beds of ion-exchange resins.

This resulted in a syrup having the following composition:

| | |
|---|---|
| Dextrose equivalent content | 58.51 |
| Dextrose content | 29.27 |
| Maltose content | 45.90 |
| Maltose/Dextrose ratio | 1.57 |
| Reducing dextrins | 3.44 |

As another example of the invention, a converter was charged with an aqueous corn starch slurry (approximately 10,000 pounds of dry substance) at between 23° to 24° Baumé (60° F.). Using 25 pounds of hydrochloric acid, the batch was converted with heat and pressure to between 21% and 22% D. E., blown to a neutralizer, and there neutralized to pH 4.9 with sodium carbonate. After one carbon treatment and filtration, the batch, at a Baumé of 21° to 22°, was pumped to a converting tank. The pH was adjusted to 4.6 and the temperature was brought to between 118° to 120° F. A fungal-enzyme combination, consisting of 0.1% (dry substance basis) of a diastase low in maltase activity and 0.1% of another diastase containing an active maltase was added. Conversion was continued at gentle agitation at the indicated temperature for 35 to 38 hours. Live steam was injected to raise the temperature to between 170° and 176° F., where it was held for 20 minutes to inactivate the enzymes. The resultant light liquor was given two carbon treatments with subsequent filtrations. The filtrate, at a pH of 5.1 was taken to the vacuum pan where it was finished at 60 to 61 D. E., 42° to 43° Baumé, and pH 5.0.

The resultant syrup had the following composition:

| | |
|---|---|
| Dextrose equivalent content | 63.06 |
| Dextrose content | 32.12 |
| Maltose content | 44.35 |
| Maltose/dextrose ratio | 1.38 |
| Reducing dextrins | 6.01 |

As a third example of the invention, an aqueous starch slurry at 22° to 24° Baumé was converted with acid under commercial refinery conditions to 15.3 D. E. The partially hydrolyzed suspension, containing refinery mud, i. e. proteinaceous and lipoid material, was taken without carbon treatment or filtration to the converting tank. Because of the low acid hydrolysis, very little reversion products were formed so that the substrate did not have to be treated or filtered as when the acid hydrolysis is carried to above 25% D. E. Consequently, this eliminates one step necessary in the presently known processes. The partially hydrolyzed substrate containing 38% to 40% solids was adjusted to a pH of 4.6 to 4.8, and its temperature lowered to between 118° and 122° F. Two saccharifying enzymes, complementary in diastatic effects, were added as follows:

(1) At zero time 0.1% of a saccharifying enzyme low in maltase activity was added and conversion allowed to proceed at 118° to 122° F. with gentle agitation;

(2) After 18 hours, 0.1% of a different saccharifying enzyme with considerable maltase, as well as beta-amylase, activity was added, and conversion continued for a total time of 60 to 70 hours. The enzymes were inactivated by heat, the products clarified and filtered, and the filtrate concentrated to commercial Baumé.

The resultant syrup had the following composition:

| | |
|---|---|
| Dextrose equivalent content | 58.11 |
| Dextrose content | 28.29 |
| Maltose content | 44.5 |
| Maltose/dextrose ratio | 1.58 |
| Reducing dextrins | 4.80 |

The following analysis of sugar distribution in two different specimens reveals that by using the method of stepwise addition of the enzymes, as opposed to addition of the total enzyme combination at zero time, the composition of the syrup, especially as to dextrose and maltose content, can be varied to an appreciable degree.

| | Stepwise addition | Mixed addition at Zero Time |
|---|---|---|
| Total D. E. | 58.11 | 61.78 |
| Dextrose | 28.29 | 35.34 |
| Maltose | 44.5 | 39.6 |
| Dextrins | 4.80 | 4.15 |

Other typical results utilizing the teachings of the present invention, employing specific enzyme preparations in particular quantities and added at the same or different times are tabulated in the attached Table No. 1.

In order to illustrate the differences between a syrup produced according to the teachings of the present invention, and syrups produced by acid conversion alone or by a dual conversion in which the initial acid hydrolysis is above 25% D. E., the compositions of various types of syrups have been tabulated in the attached Table No. 2.

Thus it is apparent that there has been provided a novel, high D. E. content, dual conversion syrup, and method for producing the same which fulfills all of the objects and advantages thought therefor.

The product of this novel dual conversion process is a novel corn syrup having a particularly pleasing sweetness, with a "cool" sensation, rather than a characteristic "burning" palate sensation such as is found in other high D. E. syrups. It differs from known syrups in having a short, velvet-smooth consistency or mouth appeal in contrast to the gummy or sticky consistency of other products. This improved consistency which results from a lower dextrin content, contributes to a greater ease of handling when the syrup must be dispensed or poured as in bakery or confectionery practices. Both properties, namely, the cool sweetness and the non-sticky consistency, are directly related to the composition or sugar distribution of this improved high D. E. syrup. Typical analysis reveals that the dextrose content is between 18% and 37%, maltose (as true maltose) between 37% and 48%, and reducing dextrins between 4.0 and 7.5%. When maltose is formed and remains undegraded to the extent indicated above, the relative proportions of both dextrose and reducing dextrins are diminished. More maltose in proportion to dextrose means a more pleasing quality of sweetness, and lower reducing dextrins results in a shorter, less gummy consistency. Applicants' syrup has a viscosity of about 3330 centipoises as measured on the Hoeppler falling ball viscosimeter, as compared with about 7680 centipoises for a syrup purportedly made according to the first patented process previously referred to.

This dual conversion product is outstanding in its freedom from bitterness. Since acid hydrolysis in the process is confined to the range of 15 to 24 D. E., relatively fewer reversion products with their inherent bitterness are formed. Subsequent enzymic hydrolysis does not produce the bitter principles and the reversion products which are characteristic of acid hydrolysis.

Furthermore, the product of this invention is readily purified by the usual industrial methods to give a high dextrose equivalent corn syrup which is low in ash, color and protein. Also, the product shows greatly improved shelf life which is due to the novel dual conversion method and the resulting composition. Color formation during aging is retarded and it is believed that the limited acid conversion limits the formation even later of colored compounds. In addition, to the high maltose content inhibits any tendency of the syrup to crystallize.

This application is a continuation-in-part of Serial No. 276,688, filed Mar. 14, 1952, now abandoned.

It is to be understood that the foregoing description and the examples have been given only by way of illustration, and that both the product and process are susceptible of variations without departing from the scope of the invention, which is limited only by the claims which follow.

What is claimed is:

1. The process for producing a high dextrose equivalent syrup, comprising the steps of subjecting an aqueous starch suspension to acidic conversion to produce a liquor having a dextrose equivalent analysis of between 15% and 24%; and subjecting said liquor to further conversion with a fungal-type saccharifying enzyme preparation comprising a plurality of enzymes, said preparation having high diastase activity and intermediate maltase activity to increase the dextrose equivalent content to between 52% and 65% and the maltose content to between 37% and 48%, while reducing the dextrin content to between 3.5% and 7.5%.

2. The process for producing a high dextrose equivalent syrup, comprising the steps of subjecting an aqueous starch suspension to acidic conversion to produce a liquor having a dextrose equivalent analysis of between 15% and 24%; and subjecting said liquor to further conversion with two complementary diastatic enzyme preparations which are added at the same time to increase the dextrose equivalent content to between 52% and 65% and the maltose content to between 37% and 48%, while reducing the dextrin content to between 3.5% and 7.5%, the one enzyme preparation being of relatively low maltase activity and the other being of relatively high maltase activity, the enzyme preparations being used in the proportions of from about 2:3 to about 3:1 measured in terms of enzyme activity as supplied commercially.

3. The process for producing a high dextrose equivalent

Table No. 1

| Acid Converted | Percent Diastase #32 | Percent Diastase #33 | Percent Rhozyme #33 | Percent Rhozyme S | Percent Rhozyme T-22 | D. E. | Percent Dextrose | Percent Maltose | Percent Dextrins |
|---|---|---|---|---|---|---|---|---|---|
| 22.5 D. E. | .16 | .16 | | | | 56.9 | 27.7 | 41.17 | 6.49 |
| 22.5 D. E. | .16 | .32 | | | | 60.56 | 31.08 | 44.05 | 4.72 |
| 19.3 D. E. | | .10 | | .10 | | 60.15 | 30.59 | 45.08 | 4.22 |
| 18.7 D. E. | | | | .01 | | 60.5 | 31.0 | 39.0 | 7.48 |
| 17.8 D. E. | | | .36 | .12 | | 60.7 | 28.6 | 46.3 | 6.1 |
| 17.5 D. E. | | .10 | | .10 | | 58.51 | 29.27 | 45.9 | 3.44 |
| 17.5 D. E. | | .32 | | .16 | | 57.92 | 28.92 | 40.79 | 6.07 |
| 17.5 D. E. | | .10 | | | .60 | 56.66 | 27.35 | 46.56 | 3.14 |
| 15.3 D. E. | | .10 | | .10 | | 61.78 | 35.34 | 39.65 | 4.15 |
| 15.3 D. E. | | .10 (68 hrs.) | | .15 (50 hrs.) | | 63.16 | 35.65 | 41.65 | 4.10 |
| 15.3 D. E. | | .08 (90 hrs.) | | .12 (72 hrs.) | | 63.46 | 36.38 | 41.04 | 4.01 |

Table No. 2

| | Syrups Made by Acid Conversion Alone | | | Above 25% D. E. Acid Conversion Plus Enzymic Conversion | | Present Invention According to Percent D. E. by Acidic Conversion | | | | |
|---|---|---|---|---|---|---|---|---|---|---|
| | C. S. U. | High Purity | | No. 1 | No. 2 | 15.3 | 17.5 | 19.3 | 21.07 | 22.5 |
| | | No. 1 | No. 2 | | | | | | | |
| Total D. E. | 42.5 | 61.7 | 59.3 | 63.32 | 63.43 | 61.37 | 58.51 | 53.10 | 62.32 | 63.46 |
| Dextrose | 19.5 | 38.82 | 35.92 | 36.02 | 36.40 | 29.23 | 29.27 | 19.75 | 32.55 | 36.69 |
| Maltose | 14.94 | 16.72 | 16.62 | 30.88 | 30.17 | 45.88 | 45.90 | 47.78 | 42.04 | 39.92 |
| Dextrins | 14.6 | 13.48 | 14.04 | 9.94 | 10.07 | 6.35 | 3.44 | 6.49 | 6.14 | 4.33 |
| Maltose/Dextrose | 0.766 | 0.431 | 0.463 | 0.863 | 0.828 | 1.6 | 1.6– | 2.42 | 1.29 | 1.09 | syrup, comprising the steps of subjecting an aqueous starch suspension to acidic conversion to produce a liquor having a dextrose equivalent analysis of between 15% and 24%; and subjecting said liquor to further conversion with two complementary diastatic enzyme preparations, one of which has relatively low maltase activity and the other has relatively high maltase activity, the enzyme preparation with the lower maltase activity being added first and the enzyme preparation with the higher maltase activity being added a selected time thereafter, the period of elapsed time between additions being such as to increase the dextrose equivalent content to between 52% and 65% and the maltose content to between 37% and 48%, while reducing the dextrin content to between 3.5% and 7.5%.

4. The process for producing a high dextrose equivalent syrup, comprising the steps of subjecting an aqueous starch suspension to acidic conversion to produce a liquor having a dextrose equivalent analysis of between 15% and 24%; and subjecting said liquor to further conversion with two complementary diastatic enzyme preparations in the proportions of from about 2:3 to about 3:1 measured in terms of enzyme activity as supplied commercially, one of said preparations having relatively low maltase activity and the other having relatively high maltase activity, the enzyme preparation with the lower maltase activity being added first and the preparation with the higher maltase activity being added a selected time thereafter, the period of elapsed time between additions being such as to increase the dextrose equivalent content to between 52% and 65% and the maltose content to between 37% and 48%, while reducing the dextrin content to between 3.5% and 7.5%.

5. The process for producing a high dextrose equivalent syrup, comprising the steps of subjecting an aqueous starch suspension to acid hydrolysis to produce a liquor having a dextrose equivalent analysis of between about 15% and about 24%; and subjecting said liquor to further conversion with two diastatic enzyme preparations, one of which is of relatively low maltase activity and the other of relatively high maltase activity, the preparation of relatively low maltase activity being added to the liquor first, and the preparation of relatively high maltase activity being added a selected time thereafter, the relative amounts of the preparations and the period of elapsed time between additions being such as to increase the dextrose equivalent to between about 52% and about 65% and the maltose content between about 37% and about 48%, while reducing the dextrin content to between about 3.5% and about 7.5%.

6. A starch conversion syrup low in ash and protein content having a dextrose equivalent analysis of between about 52 and about 65%; a dextrose content of between about 18 and about 37%; a maltose/dextrose ratio of between about 1.0 and about 2.5; a dextrin content of between about 3.5 and about 7.5; and a viscosity of less than about 5,000 centipoises as measured on the Hoeppler falling ball viscosimeter.

7. A starch conversion syrup low in ash and protein content having a dextrose equivalent analysis of between about 52 and about 65%; a dextrose content of between about 18 and about 37%; a maltose/dextrose ratio of between about 1.2 and about 1.6; a dextrin content of between about 4.0 and 6.0; and a viscosity of less than about 4,000 centipoises as measured on the Hoeppler falling ball viscosimeter; the syrup being colorless and characterized by a cool sweet taste with no burning or bitter aftertaste.

References Cited in the file of this patent

UNITED STATES PATENTS

| | | |
|---|---|---|
| 2,169,051 | Langlois | Aug. 8, 1939 |
| 2,201,609 | Dale | May 21, 1940 |
| 2,305,168 | Langlois | Dec. 15, 1942 |
| 2,383,914 | Monte | Aug. 28, 1945 |
| 2,571,541 | Cleland et al. | Oct. 16, 1951 |